(12) United States Patent
Sweeney et al.

(10) Patent No.: US 6,520,201 B2
(45) Date of Patent: Feb. 18, 2003

(54) INSULATED BACKFLOW DEVICE COVER

(76) Inventors: Lance Michael Sweeney, 35355 Los Nogales Rd., Temecula, CA (US) 92592; Tara Denise Sweeney, 35355 Los Nogales Rd., Temecula, CA (US) 92592; Daniel LeRoy ZumMallen, 24399 Oakridge Cir., Murrieta, CA (US) 92562

( * ) Notice: Subject to any disclaimer, the term of this patent is extended or adjusted under 35 U.S.C. 154(b) by 0 days.

(21) Appl. No.: 09/795,666

(22) Filed: Feb. 27, 2001

(65) Prior Publication Data

US 2002/0066483 A1 Jun. 6, 2002

Related U.S. Application Data

(60) Provisional application No. 60/251,641, filed on Dec. 5, 2000.

(51) Int. Cl.[7] ................................................. F16L 59/08
(52) U.S. Cl. ........................ 137/377; 137/382; 137/375; 138/149
(58) Field of Search ................................ 137/375, 377, 137/382; 138/149

(56) References Cited

U.S. PATENT DOCUMENTS

| | | | |
|---|---|---|---|
| 3,747,632 A | * 7/1973 | Kok et al. | .................. 137/375 |
| 3,871,400 A | * 3/1975 | Thastrup | ..................... 137/363 |
| 4,112,967 A | 9/1978 | Withem | |
| 4,890,638 A | 1/1990 | Davenport | |
| RE33,523 E | 1/1991 | Devine | |
| 5,025,836 A | 6/1991 | Botsolas | |
| 5,158,114 A | * 10/1992 | Botsolas | ..................... 138/149 |
| D349,754 S | 8/1994 | Pawar et al. | |
| 5,713,394 A | * 2/1998 | Nygaard | ..................... 138/149 |
| 5,740,832 A | 4/1998 | Griffin et al. | |
| 5,996,611 A | 12/1999 | Griffin et al. | |
| 6,021,804 A | 2/2000 | Griffin et al. | |
| 6,026,846 A | * 2/2000 | Wolf et al. | .................. 137/375 |
| 6,293,301 B1 | * 9/2001 | Griffin et al. | ................ 137/377 |

* cited by examiner

*Primary Examiner*—A. Michael Chambers
(74) *Attorney, Agent, or Firm*—Knobbe, Martens, Olson & Bear, LLP

(57) ABSTRACT

A semi-rigid cover for insulating exposed plumbing structures, such as above ground backflow devices, against freezing when exposed to subfreezing temperatures. The device includes an insulative bag and a removable outer cover that is placed over the insulative bag. The insulative bag and outer cover are closed on three sides and open on a fourth. The device also includes a plurality of securing structures, such as grommets, to facilitate securing the device to the plumbing structure with padlocks, combination locks, zip ties and the like. The device further includes a sealing structure, such as a strip of hook and loop fastener, placed along the open edge to facilitate sealing the device about the plumbing structure to minimize drafts into the interior of the device and to exclude pests. The outer cover is replaceable separately from the insulative bag to reduce replacement costs in case of damage or loss. The outer cover is highly resistant to tearing and exposure to environmental conditions such as water, sunlight, and temperature extremes. The materials of the device are all unattractive food and nesting materials to animals, birds, insects, plants, and fungi. The device is able to closely conform to the contour of the plumbing structure to improve its insulative properties. The insulative bag provides insulation against radiant, conductive, and convective heat transfer.

14 Claims, 4 Drawing Sheets

INSULATED BACKFLOW DEVICE COVER

RELATED APPLICATIONS

This application claims the benefit of U.S. Provisional Application No. 60/251,641 filed Dec. 5, 2000, entitled Insulated Backflow Device Cover.

BACKGROUND OF THE INVENTION

1. Field of the Invention

The present invention relates to the field of outdoor fluid transport systems, and in particular, to a removable, passive device which inhibits freezing of standing water contained within the fluid transport system.

2. Description of the Related Art

Municipal water supplies are generally protected from contamination by devices called backflow prevention devices. Backflow prevention devices are emplaced in a fluid transfer system to inhibit reversal of water flow back into the supply side. Flow reversal can potentially entrain contaminants picked up in the receiving side back into the supply of potable water, thereby contaminating the water supply.

Backflow prevention devices are typically required by municipal agencies and by code to be installed above ground in order to facilitate inspection and service of the devices. In addition, many backflow prevention device designs direct backflowing water out of the fluid transfer system and it is thereby desirable to elevate the backflow prevention device above the ground surface such that gravity draws away the discharged water so that the water and any entrained contaminants do not remain in proximity to the backflow prevention device and be possibly drawn back into the potable supply. The connecting plumbing is typically run underground for insulation, aesthetic, and protection purposes. As the devices are exposed to the ambient air, in many places they are also exposed to potentially sub-freezing temperatures.

Water expands in the phase change from liquid to solid and thus a solid object, filled with water, is exposed to high pressures and potential resultant damage as the water within freezes and expands. With regards to a solid backflow prevention device, the damage can be as little as a blown rubber seal or as major as a cracked bronze body. Seals can be replaced with a relatively simple tear down of the assembly. Broken bodies require complete replacement of the unit. A new unit typically requires testing and certification by a state licensed backflow technician. The average replacement cost of 1 to 2 inch sized backflow devices is between $300 and $800. As the water supply system and thus the backflow prevention devices supply water for businesses, manufacturing plants, irrigation systems, homes, schools, and many other facilities, it can be appreciated that water usage is nearly continuous and interruption of service cannot be tolerated.

In order for water contained with a fluid transport system to freeze, sufficient heat must be transferred out of the water to bring it below the freezing point. Heat transfer occurs via three mechanisms. A first mechanism is heat radiation wherein matter above absolute zero radiates thermal energy outwards. Heat radiation does not require a material medium through which to transfer the heat, i.e. radiation can occur through a vacuum, however, certain materials are quite effective at reflecting incident heat radiation back to the source material where it can be reabsorbed.

A second mechanism of heat transfer is heat conduction wherein the thermal energy of atomic motion is transferred directly through a material or from one material to another. Heat conduction requires material through which to transfer the heat and the heat will always flow from regions of higher temperatures to regions of lower temperatures according to well-known thermodynamic principles.

The third mechanism of heat transfer is heat convection wherein a temperature gradient induces fluid materials in the region of the gradient to establish a flow from the regions of higher temperature to regions of lower temperature. Convection is distinguished from conduction in that convection involves the actual movement of material while conduction is the transfer of the molecular heat energy alone.

Insulation involves inhibiting the transfer of heat through at least one and preferably all of the three mechanisms. In the field of the present invention, wherein the backflow devices are exposed to ambient air, typically at the temperate temperatures of −30 to 50° C., radiation, conduction, and convection are all mechanisms of heat transfer. Insulating against radiation typically involves placing a material in close proximity to the device of interest which reflects incident heat radiated from the device back to the device. Conduction insulation typically involves surrounding the device with material that is a poor conductor of heat to thereby slow the conduction out of the device. Convective insulation inhibits fluid movement around the device of interest so that fluid surrounding the device can not readily carry heat away.

One generally accepted method for backflow freeze protection has been the wrapping of the backflow device in fiberglass insulation covered by layers of a vinyl self-adhesive tape. Fiberglass insulation manufacturers list the thickness of the batting, usually 6 to 13 inches, required to achieve the required insulation R-value. However, the wrapping of the fiberglass with the tape locally compresses the fiberglass at different points such that some of the insulation efficiency is lost. Another problem with fiberglass insulation is that the material looses much of its insulation ability if the material becomes saturated with water. The water displaces the air held within the fiberglass materials. Trapped air is a fairly effective conductive and convective insulator, whereas water is a relatively poor insulator. Since the backflow prevention devices are installed outdoors, any tears or gaps in the vinyl wrapping can allow water to enter the insulation. Backflow devices also often develop leaks or vent water during normal operation. The tight tape wrapping can actually trap this water and saturate the insulation.

Most municipal water agencies require that backflow devices be tested and re-certified annually. This requires the removal of all insulation materials from the backflow device assembly. The fiberglass and vinyl tape is typically cut away from the device and discarded. The device is then rewrapped once the testing is completed. Contractors generally charge between $80 and $120 to re-wrap a backflow device in the manner described above. Thus fiberglass wrapped with tape is not an optimal insulator and is relatively expensive to install and maintain.

An alternative type of insulation enclosure on the market is constructed of fiberglass resin and/or sheet aluminum. The enclosure is a solid box-like structure that totally encloses the backflow device. These enclosures are mounted on concrete pads and have built in hinges that allow for tilting of the enclosure to allow for access to the equipment. These devices usually offer a fairly low R-value as the enclosure traps a great deal of air between the equipment and the enclosure. The air is free to circulate within the enclosure and thus convect heat from the backflow prevention device and the water contained therein in the manner previously described.

An additional aspect of many of these enclosures is that they include active heating of the interior of the enclosure and/or the backflow prevention device. The heating is typically resistive electrical heating supplied via line supply. The electrical heating is effective at supplying sufficient heat to the backflow device to inhibit formation of ice within the device. However, it can be appreciated that supplying electricity to the heating elements is an ongoing expense throughout the use of the enclosure. In additional, installing the heating elements and supplying them with electricity is an added expense and difficulty in installing the enclosures. The devices are accordingly expensive to purchase and install and are not easily retrofitted onto existing backflow devices.

A third known method of insulating a backflow prevention device is to install a pre-made blanket type cover over a backflow device. The ornamental design of such a cover has been issued U.S. Design Pat. No, 349,754. This blanket uses common housing construction type fiberglass insulation sewn into a canvass bag. The encapsulation of the fiberglass in the canvass actually compresses the fiberglass batting to some degree thus reducing insulation efficiency. The design of this blanket also does not completely wrap the fiberglass batting around the sides of the backflow prevention unit. This exposes portions of the backflow device to the ambient air and thus associated conductive and convective heat loss. This is due to the compression of the fiberglass that is required by the sewing of the seams with insulation materials and canvass together. Thus the sides of the backflow prevention device are only covered by the canvass bag material and are not effectively insulated. The design also includes semicircular cut away portions at the two lower corners of the cover. These areas expose the piping of the backflow device assembly to the air. This further exposes the fluid transport system and the water in the system to the ambient air and the risk of freezing.

The blankets of this design are made with simple exterior stitching that can easily become frayed or damaged. The fiberglass batting inside is not a single piece but rather two strips that are not secured together to create a continuous insulation layer. This weakens the overall integrity of the blanket and increases the potential for damage to the blanket during use. The canvass materials are water repellent but tests have shown the material to be easily torn. Any tears can allow water to enter the insulation and reduce or eliminate the insulation ability in the manner previously described.

The use of fiberglass batting and a canvass enclosure also presents attractive nesting materials for rodent pests. Tears in the canvass fabric or holes chewed by rodents allow entry of the pests into the interior. Long term field reports on the blankets previously manufactured indicate that the waterproof coating applied to the canvass quickly becomes cracked with exposure to the sun and that this allows water to penetrate into the bags.

It can be seen from the foregoing that there is an ongoing need for an inexpensive, reusable insulative cover for backflow prevention devices and other exposed regions of fluid transport systems. The insulation should be effective enough to provide adequate resistance to freezing conditions without requiring active heating. The materials of the cover should be resistant to environmental conditions commonly found outdoors and should not comprise attractive nesting or food material to rodents, birds, insects, plants, or fingi. The construction and materials of the cover should be such that the covers are resistant to water penetration and, in case of such penetration, substantially retain their insulating capability. The covers should be inexpensive to produce and install and should be reusable. It would be an additional advantage for the covers to include a securing mechanism so that vandals, curious children, or animals could not readily remove the covers.

SUMMARY OF THE INVENTION

The aforementioned needs are satisfied by the present invention, which, in one aspect, is a device for thermally insulating regions of a fluid transport system. The device comprises a flexible outer cover, an insulative bag removably attached inside the outer cover such that the outer cover and insulative bag define an interior cavity, a sealing structure attached to the insulative bag and positioned so as to removably seal the interior cavity of the insulative bag about the fluid transport system, and a plurality of securing structures interconnecting the outer cover and the insulative bag so as to removably secure the device to the region of the fluid transport system. In one aspect, the interior cavity of the device closely conforms to the contour of the region of the fluid transport system to improve the insulative properties of the device.

In another aspect of the invention, the device includes at least one layer of radiant barrier material and at least one layer of air retaining material. In one alternative aspect, the radiant barrier material and air retaining material is placed in alternating layers.

In yet another aspect of the invention, the device is made of materials that are unattractive nesting or food materials to animals, birds, insects, plants, or fuigi. The materials also absorb less than 20% by weight of water and are resistant to exposure to sunlight and temperature extremes.

These and other objects and advantages will become more fully apparent from the following description taken in conjunction with the accompanying drawings.

DETAILED DESCRIPTION OF THE PREFERRED EMBODIMENT

Figure 1:
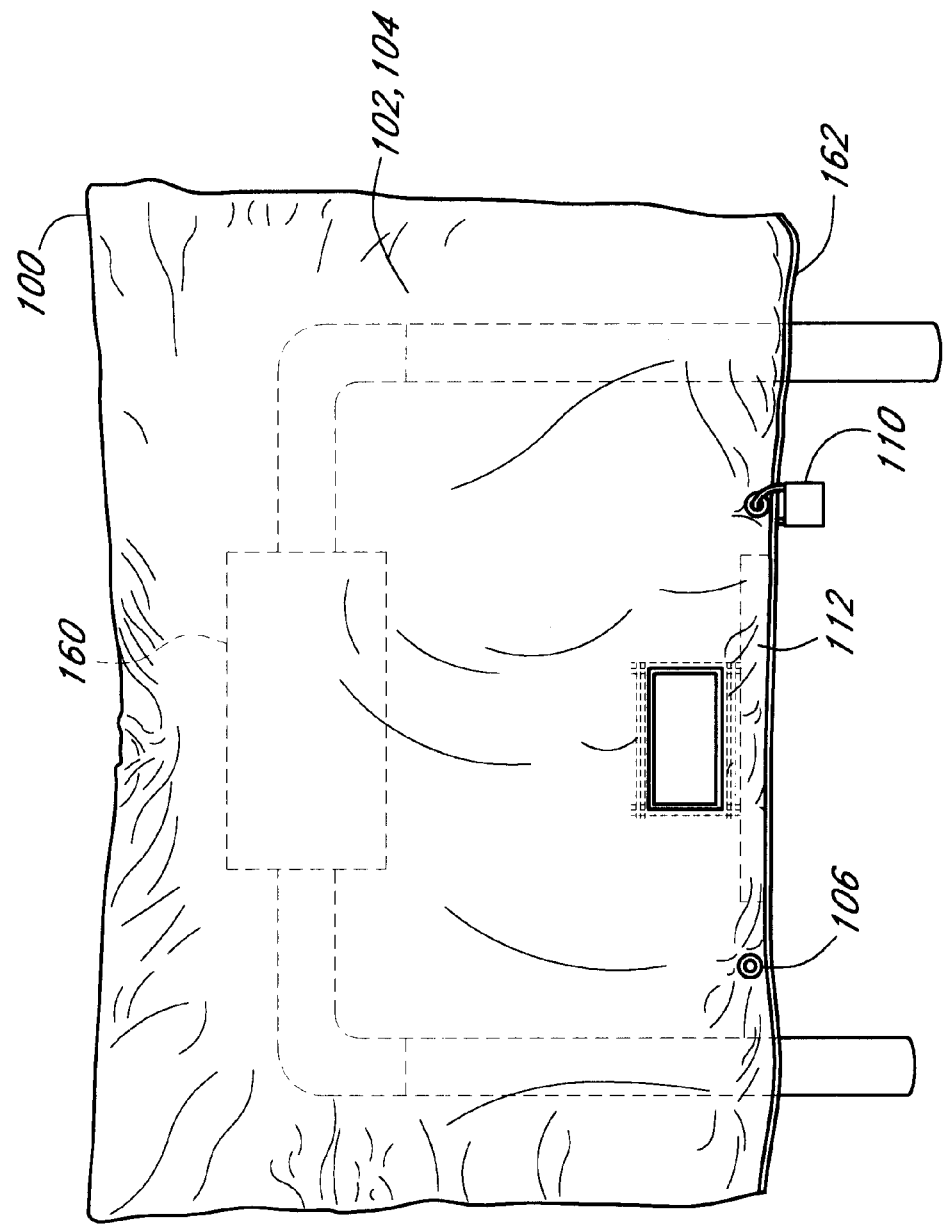
FIG. 1 is a front view of an insulated backflow device cover installed on a backflow device.
Figure 2:
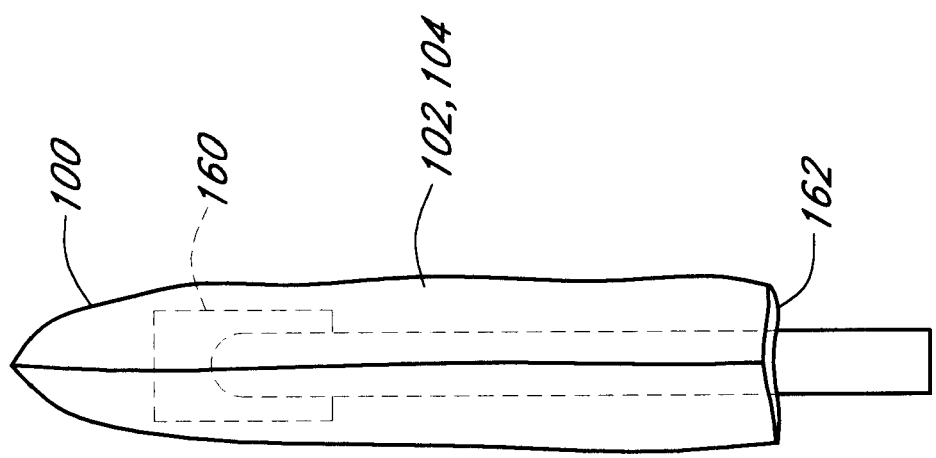
FIG. 2 is a side view of the insulated backflow device cover of FIG. 1 installed on a backflow device.

Reference will now be made to the drawings wherein like numerals refer to like parts throughout. FIGS. 1 and 2 show an assembled insulated backflow device cover 100 installed on a portion of a fluid transport system. In this embodiment, the portion of the fluid transfer system is a backflow device 160 and the fluid is water. The insulated backflow device cover 100 is generally rectangular and approximately 107 cm. by 71 cm. The insulated backflow device cover 100 comprises a removable outer cover 102 and an insulative bag 104 obscured from view in FIGS. 1 and 2, but illustrated and described in greater detail below with FIG. 4. The outer cover 102 and the insulative bag 104 and thus the insulated backflow device cover 100 are closed on three sides and open on a fourth side thereby defining an interior cavity 162. The insulated backflow device cover 100 is made of flexible materials and the interior cavity 162 thus closely conforms to the contour of the backflow device 160. The insulated backflow device cover 100 insulates standing water contained within the backflow device 160 to inhibit freezing of water contained within the backflow device 160 when ambient temperatures fall below freezing.

The outer cover 102 and insulative bag 104 comprise a plurality of securing structures 106. The securing structures 106, of this embodiment, are a plurality of brass grommets of a type known in the art attached to the outer cover 102 and insulative bag 104 adjacent the open side of the interior cavity 162 in a known manner. The insulated backflow device cover 100 is preferably placed over the backflow device 160 such that the interior cavity 162 of the insulative bag 104 is adjacent the backflow device 160. The outer cover 102 is placed over the insulative cover 104 such that the securing structures 106 of the outer cover 102 and insulative bag 104 are aligned. A plurality of securing mechanisms 110 are then placed through the securing structures 106 and secured in place. The securing mechanisms 110 of this embodiment comprise padlocks of a type known in the art, but in alternative embodiments also include combination locks, one-way slotted screws and corresponding nuts, zip ties, or other mechanisms for removably securing items known in the art without detracting from the spirit of the invention.

As is illustrated in FIG. 1, the typical backflow device 160 forms a generally U-shaped protrusion 111 that extends out of the ground. Preferably, the securing structure 106 are positioned on either side of the outer cover 102 such that the securing structures 106 are positioned within the space 113 defined by the U-shaped protrusion 111. The securing structures 106 are then secured together using the locks 110 such that the U shaped protrusion 111 prevents the back flow device cover 100 from being removed from the back flow device without the removal of the securing locks 110.

The insulative bag 104 comprises a sealing structure 112, shown in phantom in FIG. 1 placed inside the insulative bag 104 and extending along the open side of the interior cavity 162 in the insulative bag 104. In one embodiment, the sealing structure 112 comprises a length of hook and loop fastener of a type known in the art. In alternative embodiments, the sealing structure 112 comprises zippers, resealable bag structures, or other mechanisms for removably sealing an opening. The sealing structure 112 is also preferably positioned in the space 113 defined by the U-shaped structure 111 of the back flow device to seal as much of the opening of the back flow cover 100 from the elements. The sealing structure 112 removably attaches opposing faces of the open side of the insulative bag 104 in a manner well understood in the art. Closing the open side of the insulative bag 104 with the sealing structure 112 further inhibits air flow into and out of the interior cavity 162 of the insulative bag 104, thereby further reducing convective heat loss from the backflow device 160 and reducing the risk of freezing. Closing the open side of the interior cavity 162 of the insulative bag 104 with the sealing structure 112 also inhibits entrance of rodents, birds, insects, or other pests into the interior cavity 162 of the insulative bag 104 which might gnaw, nest, or grow in the insulated backflow device cover 100.

It will be appreciated that the insulated backflow device cover 100, with the securing structures 106 secured with the securing mechanisms 110 and further secured with the sealing structure 112 as previously described, is removably fixed in place so as to resistant to being displaced by high winds, curious children, vandals, or animals. However, the insulated backflow device cover 100 can also be readily removed by service or maintenance personnel to facilitate servicing the backflow device 160 and the insulated backflow device cover 100 can then be readily replaced and resecured in the manner previously described.

Figure 3:
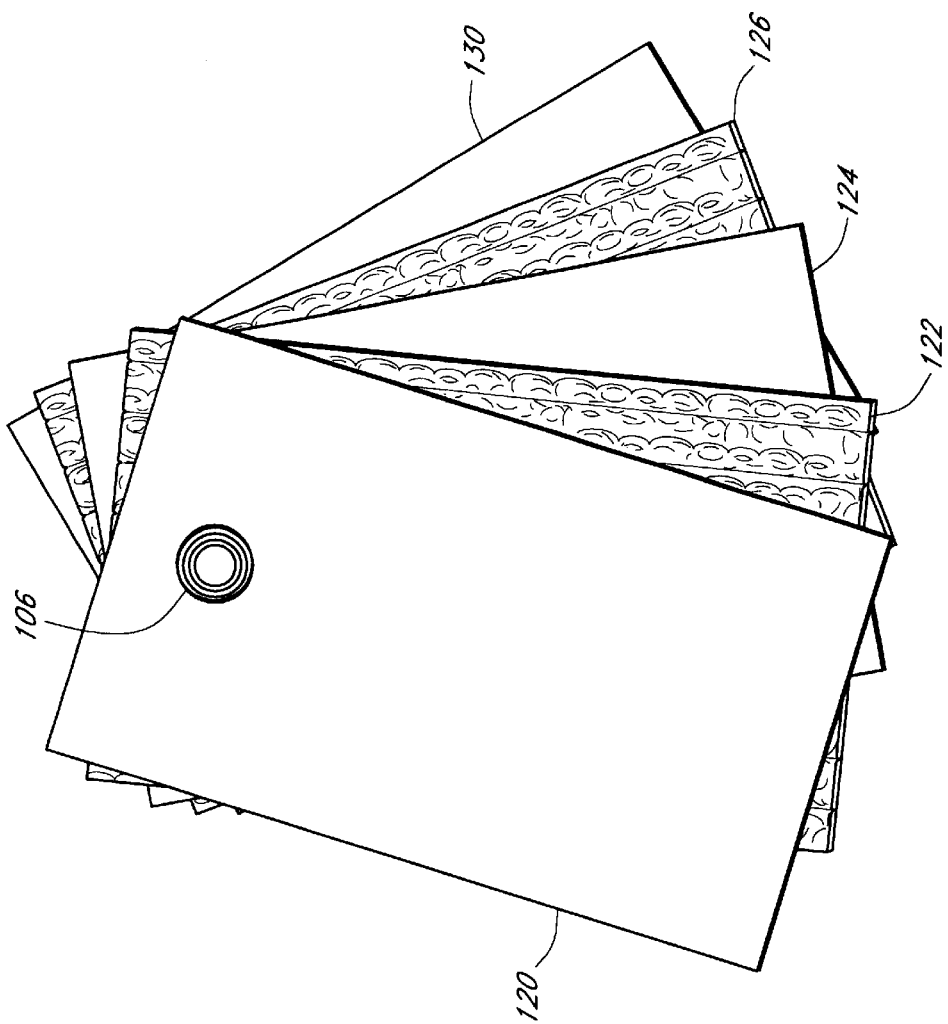
FIG. 3 is a top view of the multiple material layers of a backflow device cover.

FIG. 3 illustrates the component materials of the insulated backflow device cover 100 and their relative placement. In particular, the insulated backflow device cover 100 of this embodiment comprises an outer layer 120, a first radiant barrier layer 122, an air retaining layer 124, a second radiant barrier layer 126, a liner 130, and a plurality of securing structures 106.

The outer layer 120 is a rectangular, planar piece of acrylic resin coated 600-denier polyester approximately 215 cm by 142 cm. The outer layer 120 is flexible and is resistant to deterioration from exposure to UV radiation, temperature cycling, and water such as would typically be experienced in an outdoor environment. The outer layer 120 is also cut and tear resistant. The outer layer 120 is used to make the outer cover 102 in a manner that will be described in greater detail below with reference to FIG. 4 and provides a durable exterior to the insulated backflow device cover 100.

The first 122 and second 126 radiant barrier layers comprise rectangular, 3/16" thick, planar pieces of radiant barrier foil comprising a sheet of polyethylene bubbles sandwiched between two layers of industrial strength aluminum foil approximately 215 cm by 142 cm. The first 122 and second 126 radiant barrier layers substantially reflect incident radiant heat energy. In addition, the first 122 and second 126 radiant barrier layers, comprising a sandwich of bubbles between aluminum foil, substantially inhibits conduction and convection of heat energy across the first 122 and second 126 radiant barrier layers.

The air retaining layer 124 in this embodiment comprises a rectangular piece of ¼" water polyolefin foam approximately 215 cm by 142 cm. The air retaining layer 124 is semi-rigid and assists the insulated backflow device cover 100 maintain a desired rectangular shape. The air retaining layer 124 contains trapped air within the polyolefin foam and is non-absorbent of water and thus provides additional insulation against conductive and convective heat flow.

The liner 130 comprises a rectangular, planar piece of 200 denier nylon, water repellent flexible fabric approximately 215 cm by 142 cm. The liner 130 provides the interior cavity 162 of the insulated backflow device cover 100 with a low coefficient of friction surface that is resistant to tearing in order to facilitate attaching the insulated backflow device cover 100 to a backflow device without damaging the insulated backflow device cover 100.

Figure 4:
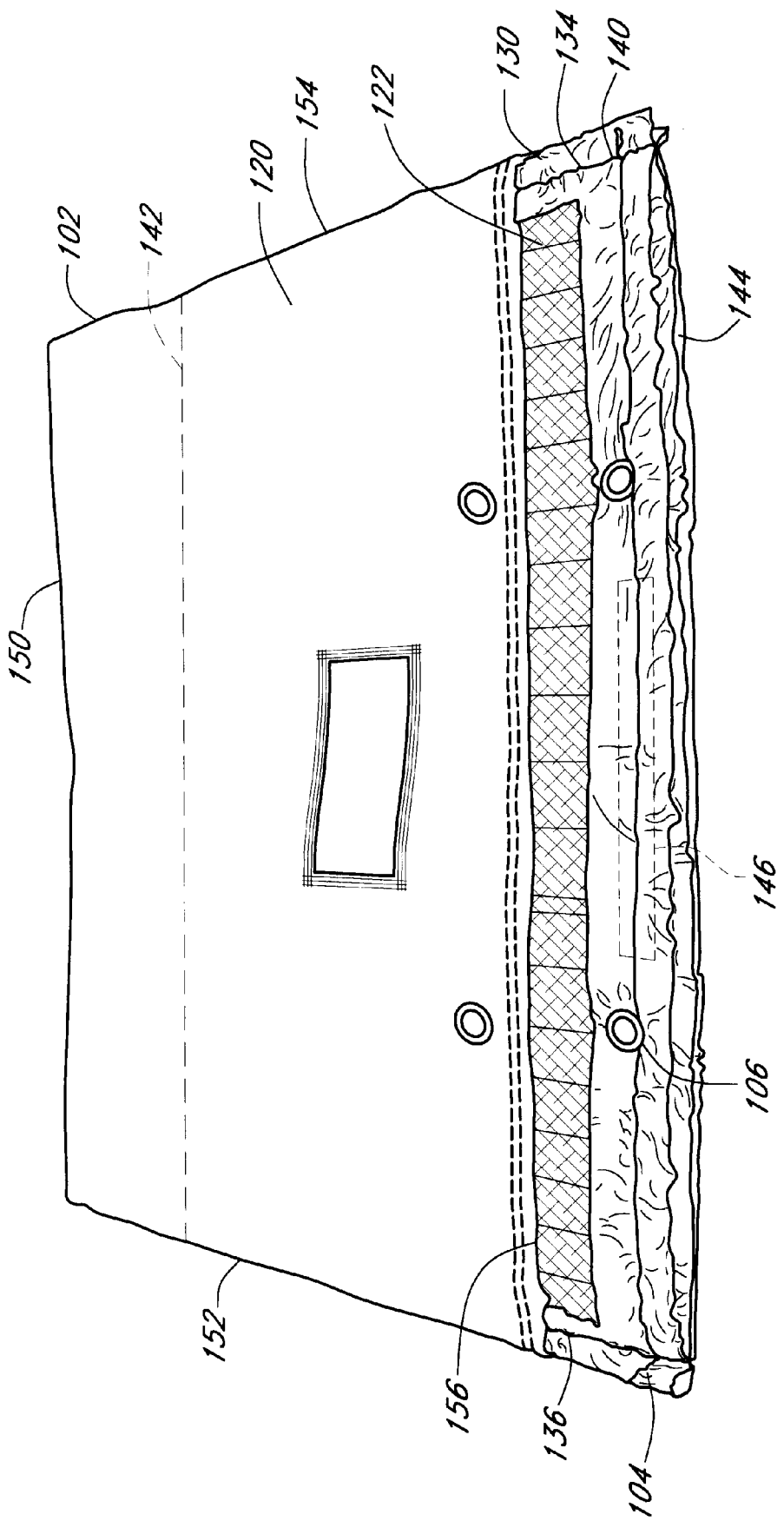
FIG. 4 is a perspective view of an insulated backflow device cover with the outer cover partially removed to show the inner layers.

The first 122 and second 126 radiant barrier layers, the air retaining layer 124, the liner 130, and the securing structures 106 are interconnected in the layers indicated in FIG. 3 to form the insulative bag 104 as illustrated in FIG. 4. In particular, the first radiant barrier layer 122 is placed adjacent a first side of the air retaining material 124. A second side of the air retaining material 124 is placed adjacent a first side of the second radiant barrier layer 126. A second side of the second radiant barrier layer 126 is placed adjacent the liner 130. The first 122 and second 126 radiant barrier layers and the air retaining layer 124 are aligned with each other and the first 122 and second 126 radiant barrier layers and the air retaining layer 124 are further positioned so as to be generally centered within the contour of the liner 130. It will be appreciated from the dimensions of the first 122 and second 126 radiant barrier layers, the air retaining layer 124, and the liner 130 that the liner 130 extends approximately 3.5–4 cm beyond the edges of the first 122 and second 126 radiant barrier layers and the air retaining layer 124.

This 3.5–4 cm of the liner 130 is then folded back over the four sides of the first 122 and second 126 radiant barrier layers and the air retaining layer 124 so as to be adjacent the first radiant barrier layer 122 and so as to extend approximately 3.5–4 cm inwards from the edge of the first radiant barrier layer 122. Stitches 134 are then placed through the first 122 and second 126 radiant barrier layers, the air retaining layer 124, and two layers of the liner 130 approximately 2–3 cm from each edge of the folded liner 130 so as to extend along each edge substantially from each edge to the opposite edge. The stitches 134 comprise a length of polyester thread of a known type placed in a series of interlocking knots in a known manner.

The first 122 and second 126 radiant barrier layers, the air retaining layer 124, and the liner 130 are then folded in half so as to form a folded structure approximately 107 cm by 71 cm and such that the liner 130 is folded towards itself. A second set of stitches 134 are then placed through the two layers of the first 122 and second 126 radiant barrier layers, the air retaining layer 124, and two layers of the liner 130 so as to extend substantially along a first side 136 and a second side 140 opposite the first side 136 thereby forming the insulative bag 104. It will be appreciated that folding the first 122 and second 126 radiant barrier layers, the air retaining layer 124, and two layers of the liner 130 in the manner previously described will form a closed fold line along a third side 142 of the insulative bag 104 and thereby define the interior cavity 162.

The insulative bag 104 also comprises the sealing structure 112 (obscured from view in FIGS. 1, 2, and 4). In this embodiment, the sealing structure 112 is a length of hook and loop fastener approximately 15 cm by 2 cm attached inside a fourth side 144 of the insulative bag 104 in a known manner so as to extend along the fourth side 144. In one embodiment, the sealing structure 112 is placed after the insulative bag 104 is stitched in the manner previously described. The sealing structure 112 facilitates securing the insulated backflow device cover 100 to the backflow device 160 in the manner previously described.

The insulative bag 104 also comprises four securing structures 106 placed adjacent the fourth side 144 and adjacent the ends of the hook and loop fastener 146. The securing structures 106 are brass grommets of a type known in the art and installed in a known manner. Two securing structures 106 are positioned on each face of the insulative bag 104 so as to be aligned with the other two securing structures 106 on the opposing face of the insulative bag 104.

The outer layer 120 is folded in half in two layers thereby forming a closed fold line along a first side 150. Stitches 134 are then emplaced extending substantially completely along a second 152 and third 154 side of the outer cover 120 adjacent the first side 150 and approximately 1cm from the edge of the second 152 and third 154 sides. The stitches 134 close the outer layer 120 on the second 152 and third 156 sides and the folded outer layer 120 closes the first side 150. A fourth side 156 opposite the first side 150 is left open. The outer layer 120 is then turned inside out in a known manner such that the stitches 134 are inside the folded outer layer 120, thereby forming the outer cover 102 and defining the interior cavity 162.

The outer cover 102 also comprises four securing structures 106 placed adjacent the fourth side 156. Two securing structures 106 are positioned on each face of the outer cover 102 so as to be aligned with the other two securing structures 106 on the opposing face of the outer cover 102.

The insulated backflow device cover 100 as described above is thus made of materials that are durable in environmental conditions such as rain, sunlight, and temperature extremes. The insulated backflow device cover 100 is further made of materials that are unattractive nesting or food materials to animals, birds, insects, plants, or fungi. The insulated backflow device cover 100 is also constructed and installed in such as way as to inhibit entrance of pests into the interior cavity 162 of the insulated backflow device cover 100.

The insulated backflow device cover 100 is readily installed on a backflow device 160 and also readily removed by service personnel to facilitate access to the backflow device 160. However, when installed, the insulated backflow device cover 100 is resistant to being displaced by winds, curious children, vandals, or animals.

Being constructed of effective insulation materials and closely conforming to the contour of a backflow device 160, the insulated backflow device cover 100 offers effective thermal insulation against radiant, conductive, and convective heat transfer. The insulated backflow device cover 100 provides increased resistance to freezing of water contained within backflow devices 160 fitted with the insulated backflow device cover 100 without requiring expensive and complicated active heating.

The outer cover 102 is separable from the insulative bag 104 and can thus be replaced separately in case of damage or loss to reduce the costs of the insulated backflow device cover 100. In addition, the outer cover 102 is preferably provided in unobtrusive, natural colors to improve the aesthetics of employing the insulated backflow device cover 100.

Although the preferred embodiments of the present invention have shown, described and pointed out the fundamental novel features of the invention as applied to those embodiments, it will be understood that various omissions, substitutions and changes in the form of the detail of the device illustrated may be made by those skilled in the art without departing from the spirit of the present invention. Consequently, the scope of the invention should not be limited to the foregoing description but is to be defined by the appended claims.

What is claimed is:

1. A device for thermally insulating regions of a fluid transport system, the device comprising:

a flexible outer cover formed of a damage resistant and environment resistant material that is attached together so as to define a substantially enclosed bag with an opening;

an insulative bag comprised of at least one layer of radiant barrier material and heat retention material attached together so as to define a substantially enclosed bag with an opening wherein the insulative bag is positioned within the opening of the flexible outer cover such that the outer cover and the insulative bag define an interior cavity with an opening sized to receive the fluid transport system;

a sealing structure attached to the device adjacent the opening for the fluid transport system and positioned so as to removably seal the interior cavity of the insulative gas about the region of the fluid transport system; and a plurality of securing structures mounted to the device adjacent the opening so as to removably secure the device to the region of the fluid transport system.

2. The device of claim 1, wherein the insulative bag comprises at least one layer of a radiant barrier material and at least one layer of an air retaining material.

3. The device of claim 2, wherein the insulative layer further comprises a liner layer.

4. The device of claim 3, wherein the layer of radiant barrier material comprises a layer of radiant barrier foil.

5. The device of claim 4, wherein the layer of radiant barrier foil comprises two layer of aluminum foil with a layer of polyethylene bubble material interposed therebetween.

6. The device of claim 4 wherein the air retaining material comprises a layer of water polyolefin foam.

7. The device of claim 1, wherein the insulating bag retains a plurality of quantities of air adjacent the region of the fluid transport system such that the air is restricted from movement such that the insulating layer provides a barrier to the conduction and convection of heat from the region of the fluid transport system.

8. The device of claim 1, wherein the insulative layer comprises alternating layers of radiant barrier material and air retaining material such that the layers of air retaining layers inhibit conduction of heat through the radiant barrier layers.

9. A device for thermally insulating a U-shaped backflow device, the device comprising:

a flexible outer cover formed of a damage resistant and environment resistant material that is attached together to define a substantially enclosed bag with an opening;

an insulative bag comprised of at least one layer of radiant barrier material and heat retention material attached together so as to define a substantially enclosed bas with an opening wherein the insulative bag is positioned within the opening of the flexible outer cover, wherein the flexible outer cover and the insulative layer define a cavity therein that is sized so as to receive the U-shaped backflow device wherein the insulative bag provide a radiant barrier that inhibits radiant heat loss within the cavity and a air retaining barrier that inhibits air flow out of the cavity to thereby inhibit convention and conduction cooling of the U-shaped back flow device; and at least one securing structure formed on the device so as to secure the outer cover and the insulative bag about the U-shaped backflow device so that the device cannot be removed from the U-shaped backflow device without removal of the at least one securing structure.

10. The device of claim 9, wherein the flexible outer cover comprises a weather resistant outer cover.

11. The device of claim 9, wherein the insulative layer comprises a layer of radiant barrier material and a layer of air retaining material.

12. The device of claim 11, wherein the layer of radiant barrier material comprises a first and a second layer of aluminum foil with a layer of polyethylene bubble material interposed therebetween.

13. The device of claim 11, wherein the layer of air retaining material comprises a layer of water polyolefin foam.

14. The device of claim 11, wherein the securing structure comprises:

a first and a second grommet formed on a first and a second edge of the outer cover so that when the device is positioned on the U-shaped backflow device, the first and second grommet are positioned within a space defined by the U-shaped backflow device that is enclosed by the U-shaped backflow device and the ground with the first grommet being positioned on the first side of the backflow device and the second grommet being positioned on the second side of the backflow device; and a lock that is attached in the openings of the first and second grommet such that the lock interconnects the first and second edges of the outer cover to each other within the space defined by the U-shaped back flow device such that the device cannot be removed from the U-shaped backflow device without removal of the lock.

* * * * *